(12) United States Patent
Hatano et al.

(10) Patent No.: US 6,627,687 B2
(45) Date of Patent: Sep. 30, 2003

(54) RUBBER COMPOSITION FOR ADHERING TO STEEL CORDS

(75) Inventors: Seiji Hatano, Osaka (JP); Hirofumi Hayashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 298 days.

(21) Appl. No.: 09/866,412

(22) Filed: May 25, 2001

(65) Prior Publication Data

US 2002/0045687 A1 Apr. 18, 2002

(30) Foreign Application Priority Data

Aug. 28, 2000 (JP) ......................................... 2000-257020

(51) Int. Cl.[7] .................................................. C08K 5/34
(52) U.S. Cl. ........................ 524/236; 524/204; 524/348; 524/349; 524/351; 524/352; 524/323; 524/492; 524/493; 524/612
(58) Field of Search ................................. 524/236, 204, 524/348, 349, 351, 352, 323, 492, 493, 612

(56) References Cited

FOREIGN PATENT DOCUMENTS

| | | | |
|---|---|---|---|
| JP | 06329839 | | 11/1994 |
| JP | 06329840 | | 11/1994 |
| JP | 11060820 | | 3/1999 |
| JP | 11246835 | * | 9/1999 |
| JP | 11263954 | | 9/1999 |

* cited by examiner

*Primary Examiner*—David W. Wu
*Assistant Examiner*—William K Cheung
(74) *Attorney, Agent, or Firm*—Jordan and Hamburg LLP

(57) ABSTRACT

The invention aims at providing a rubber composition for adhering to steel cords which is excellent in heat-resistant adhesion and moist heat-resistant adhesion as well as initial adhesion and has performance of a level similar to or higher than that of the related art in resistance to rubber fracture, wherein the following component (A) is blended in a metal-converted amount of 0.01 to 10 weight parts to 100 weight parts of rubber components containing natural rubber and/or diene synthetic rubber:

Component (A): a mixture of a compound containing nickel, a compound containing molybdenum, and a compound containing cobalt; or a compound containing nickel, molybdenum, and cobalt simultaneously.

7 Claims, No Drawings

RUBBER COMPOSITION FOR ADHERING TO STEEL CORDS

BACKGROUND OF THE INVENTION

1. Field of the Invention

The present invention relates to a rubber composition for adhering to steel cords and particularly to a rubber composition for adhering to steel cords which is excellent in adhesion to steel cords.

2. Description of the Related Art

In order to increase the adhesive force of rubber to steel cords plated with brass, bronze, or zinc, a cobalt salt of an organic acid has exclusively been used so far. That is, there exists a technique where blending of the cobalt salt of an organic acid with a rubber composition promotes the formation of an adhesive interface layer onto steel cords, thus to increase the adhesive force.

In recent years, problems have been generated such as deterioration in adhesive force caused by high exothermic heat accompanied by speeding up or power up of vehicles, deterioration in adhesive force caused by thermal history accompanied by prolonged lifetime of tires, or deterioration in adhesive force caused by moisture and heat over a period of time which elapses between manufacture and travel (a storing time from manufacture to use, containing a time of practical use), and thus adhesive properties of a higher level have been demanded.

Although the cobalt is excellent in initial adhesion, heat deterioration (heat aging) causes serious deterioration in adhesive force as described above. The cobalt cannot be satisfying any more adhesion performance of a high level required in recent years. It is probable that the cobalt has a strong action to promote oxidation, and the action thereof to promote the formation of an adhesive layer causes increase in thickness of the adhesive layer in terminal travel to lead to fracture of the rubber layer.

The cobalt is a rare metal, and countries producing the raw material thereof may be politically unstable. Accordingly, the cobalt is disadvantageous in high fluctuation in price and unstable supply of rubber products.

SUMMARY OF THE INVENTION

The invention has been carried out under the aforesaid circumstances. An aim of the invention is to provide a rubber composition for adhering to steel cords without relying only on the cobalt, composition which has excellent heat-resistant adhesion and moist heat-resistant adhesion as well as excellent initial adhesion and performance of a level similar to or higher than that in the related art as to resistance to rubber fracture.

A rubber composition for adhering to steel cords as described in claim 1 is a rubber composition excellent in adhesion to steel cords. The rubber composition is prepared by adding the following component (A) in a metal-converted amount of 0.01 to 10 weight parts to 100 weight parts of a rubber component containing natural rubber and/or a diene synthetic rubber.

(A) A mixture of a compound containing nickel, a compound containing molybdenum, and a compound containing cobalt; a compound containing simultaneously nickel, molybdenum, and cobalt; or a mixture of a compound containing simultaneously two metallic elements selected from nickel, molybdenum, and cobalt and a compound containing the residual metallic element.

A composition as described in claim 2 is prepared by further adding the following component (B) consisting of (b1) and (b2) in the composition as described in claim 1.

(B) (b1) 0.2 to 20 weight parts of hexamethylenetetramine or a melamine derivative, and (b2) 0.1 to 10 weight parts of at least one selected from the group consisting of phenol resins, resorcin, resorcin derivatives, and cresol resins.

A composition as described in claim 3 is prepared by further adding a compound containing calcium (C) in the composition as described in claim 1 or 2.

A composition as described in claim 4 is prepared by adding the aforesaid compound containing calcium (C) in an amount of 0.1 to 20% in weight ratio to the aforesaid component (A) in the composition as described in claim 3.

A composition as described in claim 5 is prepared by further adding silica (D) in the composition as described in any one of claims 1 to 4.

A composition as described in claim 6 is prepared by adding 1 to 100 weight parts of the aforesaid silica (D) to 100 weight parts of the rubber component in the composition as described in claim 5.

The invention can provide a rubber composition for adhering to steel cords which has excellent heat-resistant adhesion and excellent moist heat-resistant adhesion as well as excellent initial adhesion and performance of a level similar to or higher than that in the related art as to resistance to rubber fracture.

DETAILED DESCRIPTION OF THE INVENTION

Rubber Components

Examples of rubber components used in the invention include natural rubber and synthetic rubber such as polyisoprene rubber (IR), polybutadiene rubber (BR), styrene-butadiene rubber (SBR), isoprene-isobutylene rubber (IIR), ethylene-propylene-diene rubber (EPDM), and modified rubber thereof. These can be used singly or as a mixture of two or more thereof.

Component (A)

The compound containing nickel, the compound containing molybdenum, and the compound containing cobalt can be either an inorganic compound or an organic compound, respectively.

The inorganic compounds include nickel oxide, molybdenum oxide, and cobalt oxide; nickel sulfate, molybdenum sulfate, and cobalt sulfate; nickel phosphate, molybdenum phosphate, and cobalt phosphate; nickel phosphite, molybdenum phosphite, and cobalt phosphite; nickel carbonate, molybdenum carbonate, and cobalt carbonate; and nickel chloride, molybdenum chloride, and cobalt chloride.

The organic compounds include nickel salts, molybdenum salts, and cobalt salts of organic acids; and an organonickel sulfur compound, an organomolybdenum sulfur compound, and an organocobalt sulfur compound.

Herein, preferred nickel salts of organic acids are nickel naphthenate, nickel octylate, nickel propionate, nickel abietate, and nickel acetate in view of excellent adhesion performance.

Preferred molybdenum salts of organic acids are molybdenum naphthenate and/or molybdenum abietate in view of excellent adhesion performance.

Furthermore, the cobalt salts of organic acids are cobalt salts of neodecanoic acid, stearic acid, naphthenic acid, rosin, tall oil acid, oleic acid, linoleic acid, and linolenic acid. Herein, these organic acids can be partly replaced with compounds containing boron such as boric acid.

In component (A), a Ni/Mo ratio (weight converted to metals) is not particularly limited, but preferably is from 2/1 to 20/1. The ratio less than 2/1 may invite problems of being uneconomical (Mo is very costly as compared with Ni) and decreasing hardness (rigidity) of the resulting rubber. Exceeding 20/1 may invite a problem of being unable to acquire sufficient adhesion (Ni cannot compensate deterioration in adhesion).

In these salts of organic acids, it also is possible to blend organic acids. For example, adhesion, particularly moist heat adhesion is preferably improved when component (A) is a mixture of nickel salts of naphthenic acid and octylic acid (naphthenic acid/octylic acid=$\frac{1}{1}$ to $\frac{1}{4}$ in weight percent) and a molybdenum salt of naphthenic acid.

Naphthenic acid is preferred on the grounds that the high acid value of, for example, 250 mgKOH/g or more further improves the adhesion, particularly the heat-resistant adhesion.

In component (A), it is preferable that the ratio of cobalt to total weight of Ni and Mo is from 1 to 50 weight percent. The ratio of cobalt less than 1 weight percent may not lead to sufficient initial adhesion whereas exceeding 50 weight percent may cause serious decrease in adhesion owing to heat aging or cause decrease in cost merit. Herein, the range is preferably from 10 to 20 weight percent.

Component (B)

A combination of the following components (b1) and (b2) composes component (B) of the invention.

(b1) hexamethylenetetramine or melamine derivatives.

(b2) at least one selected from the group consisting of phenol resins, resorcin, resorcin derivatives, and cresol resins.

An example of the melamine derivatives is hexamethoxymethylmelamine.

Examples of the resorcin derivatives include resorcin/alkylphenol/formalin copolymers and resorcin/formalin reaction products.

Component (B) is preferably used to improve markedly the adhesion, particularly the initial adhesion.

Component (C)

Use of compounds containing calcium (C) is preferred on the grounds of further improving the adhesion, particularly the heat-resistant adhesion.

Examples of compounds containing calcium (C) include calcium borate and calcium neodecanoate, but are not limited to these salts.

Compounds containing calcium (C) are preferably added to component (A) during the preparation thereof on the grounds that an effect of improving the hardness (rigidity) of the resulting rubber can be acquired (When component (C) is added to rubber singly apart from component (A), such effect can not be obtained).

Component (D) Addition of silica (component (D)) can further improve the adhesion. Silica used include dry process silica (silicic acid anhydride) and wet process silica (hydrated silicic acid), but are not particularly limited.

Carbon Black

Carbon black usable in the invention is not particularly limited, and according to the classification by ASTMD1765, include SAF class having numbers of 100's, ISAF class having numbers of 200's, and HAF class having numbers of 300's which have a high reinforcing action, and concretely include N110, N121,N219,N220,N231,N330,and N339. These can be used singly or as a mixture of two or more thereof.

The Rest (Ratio of Blend and Others)

The ratio of component (A) blended is from 0.01 to 10 weight parts (in conversion to metal) to 100 weight parts of the rubber component. The ratio of component (A) less than 0.01 weight part invites a problem of failing to obtain sufficient initial adhesion. Exceeding 10 weight parts results in promoting oxidative deterioration of rubber by metal and decreasing aging resistance of the rubber, and as a result offers a problem of decreasing adhesion after aging. The range is preferably from 0.01 to 5.0 weight parts, and more preferably from 0.01 to 2.0 weight parts (in conversion to metal).

About component (B), the ratio of component (b1) blended is preferably from 0.2 to 20 weight parts to 100 weight parts of the rubber component. The ratio of component (b2) blended is preferably from 0.1 to 10 weight parts to 100 weight parts of the rubber component (The ratio varies depending upon purposes and kinds of resins used and cannot be unconditionally determined). When the ratio of component (b1) blended is less than 0.2 weight part or the ratio of component (b2) is less than 0.1 weight part to 100 weight parts of the rubber component, an effect of improving the adhesion cannot be sufficiently achieved. The ratio of component (b1) blended exceeding 20 weight parts or the ratio of component (b2) exceeding 10 weight parts makes the rubber resinous and fragile. Herein, a preferred range of component (b1) is from 0.5 to 10 weight parts, and that of component (b2) is from 0.5 to 5.0 weight parts.

The ratio of a compound containing calcium (C) blended is from 0.1 to 20 percent in weight ratio to component (A). The ratio of component (c) blended is less than 0.1 weight percent fails to achieve sufficient improvement in heat-resistant adhesion whereas exceeding 20 weight percent makes it difficult to prepare component (A). Herein, a preferred range is from 1 to 10 weight percent.

The ratio of sulfur blended is not particularly limited, and for example, from 1 to 10 weight percent.

EXAMPLES

The invention is illustrated through examples, but is not to be construed as limited by the examples.

Examples and Comparative Examples

Common components as described in the following "table 1" and respective components as described in the following "tables 2 to 5" were blended in ratios as described in the tables. Thereafter, these components were kneaded by use of a Banbury mixer according to a general procedure to prepare rubber compositions. About the resulting rubber compositions, an adhesion test (initial adhesion, heat-resistant adhesion, moist heat-resistant adhesion) and an aging resistance test were carried out and evaluated. The respective procedures of evaluation are as follows:

(1) Adhesion Test

Steel cords plated with brass were arranged at intervals of 12 lengths/25 mm and separated by seating rubber to be evaluated. Two sheets of such rubber were piled and vulcanized at 150° C. for 30 min to prepare a sample. Peel force of the sample of 25-mm width was measured by use of an autograph. A covering ratio by the steel cord rubber was evaluated by inspection with the naked eye.

The initial adhesion, heat-resistant adhesion, and moist heat-resistant adhesion were evaluated (Heat-resistant adhesion: undergoing aging in a 160° C. oven to evaluate adhesion. Moist heat-resistant adhesion: A sample is placed in an autoclave containing water and subjected to aging in a 105° C. oven to evaluate adhesion). Results of measurements were estimated by indexes based on the results of Comparative Example 1 estimated as 100 and described in Tables 2 to 5.

(2) Aging Resistance Test

After aging in a Geer oven (after aging a sample in the 90° C. oven), a tensile test was carried out (according to JIS K6253). Retention degrees of breaking extension to the initial value were represented by indexes based on the result of Comparative Example 1 estimated as 100. Resulted are described in Tables 2 to 5.

TABLE 1

| | |
|---|---|
| Natural Rubber | 100 parts |
| Carbon Black (HAF) | 60 parts |
| Zinc White | 8 parts |
| Aging Preventive (6C) | 2 parts |
| Insoluble Sulfur | 6 parts |
| Promoter (DZ) | 1 part |

TABLE 2

| | Comparative Example | | | |
|---|---|---|---|---|
| | 1 | 2 | 3 | 4 |
| Cobalt Stearate | ◯ | | | |
| Sample 1[*1] | | ◯ | | |
| Sample 2[*2] | | | | |
| Sample 3[*3] | | | | |
| Sample 4[*4] | | | ◯ | ◯ |
| Sample 5[*5] | | | | |
| Sample 6[*6] | | | | |
| Sample 7[*7] | | | | |
| Sample 8[*8] | | | | |
| Sample 9[*9] | | | | |
| Amount of the aforesaid Metallic Compound Blended to 100 Parts of Rubber Component (Amount Converted to Metal) (Part) | 0.2 | 0.2 | 0.005 | 15 |
| SUMIKANOL 620 (Sumitomo Chemical Co., Ltd.)[*11] | | | | |
| SCILETTU 963L (Mitsui Scitech)[*12] | | | | |
| Initial Adhesion | | | | |
| Peel Force | 100 | 82 | 63 | 91 |
| Covering Ratio of Rubber | 100 | 100 | 100 | 100 |
| Heat-Resistant Adhesion (160° C. × 96 h age) | | | | |
| Peel Force | 100 | 75 | 111 | 83 |
| Covering Ratio of Rubber | 50 | 50 | 60 | 30 |
| Moist Heat Adhesion (105° C. × 96 h steam age) | | | | |
| Peel Force | 100 | 83 | 125 | 107 |
| Covering Ratio of Rubber | 10 | 10 | 10 | 5 |
| Aging Resistance (90° C. × 192 h age) | | | | |
| Degree of Improvement | 100 | 106 | 117 | 75 |

TABLE 3

| | Example | | | | | |
|---|---|---|---|---|---|---|
| | 1 | 2 | 3 | 4 | 5 | 6 |
| Cobalt Stearate | | | | | | |
| Sample 1[*1] | | | | | | |
| Sample 2[*2] | ◯ | | | | | |
| Sample 3[*3] | | ◯ | | | | |
| Sample 4[*4] | | | ◯ | | | |
| Sample 5[*5] | | | | ◯ | | |
| Sample 6[*6] | | | | | ◯ | |
| Sample 7[*7] | | | | | | ◯ |
| Sample 8[*8] | | | | | | |
| Sample 9[*9] | | | | | | |
| Amount of the aforesaid Metallic Compound Blended to 100 Parts of Rubber Component (Amount Converted to Metal) (Part) | 0.2 | 0.2 | 0.2 | 0.2 | 0.2 | 0.2 |
| SUMIKANOL 620 (Sumitomo Chemical Co., Ltd.)[*11] | | | | | | |

TABLE 3-continued

| | Example | | | | | |
|---|---|---|---|---|---|---|
| | 1 | 2 | 3 | 4 | 5 | 6 |
| SCILETTU 963L (Mitsui Sciteck)[*12] | | | | | | |
| Initial Adhesion | | | | | | |
| Peel Force | 101 | 104 | 106 | 105 | 101 | 107 |
| Covering Ratio of Rubber | 100 | 100 | 100 | 100 | 100 | 100 |
| Heat-Resistant Adhesion | | | | | | |
| (160° C. × 96 h age) | | | | | | |
| Peel Force | 94 | 99 | 102 | 100 | 101 | 97 |
| Covering Ratio of Rubber | 50 | 50 | 60 | 50 | 40 | 60 |
| Moist Heat-resistant Adhesion | | | | | | |
| (105° C. × 96 h steam age) | | | | | | |
| Peel Force | 125 | 123 | 124 | 123 | 125 | 118 |
| Covering Ratio of Rubber | 20 | 15 | 10 | 10 | 10 | 20 |
| Aging Resistance (90° C. × 192 h age) | | | | | | |
| Degree of Improvement | 103 | 102 | 101 | 102 | 101 | 100 |

TABLE 4

| | Example | | | |
|---|---|---|---|---|
| | 7 | 8 | 9 | 10 |
| Cobalt Stearate | | | | |
| Sample 1[*1] | | | | |
| Sample 2[*2] | | | | |
| Sample 3[*3] | | | | |
| Sample 4[*4] | | | | |
| Sample 5[*5] | | | | |
| Sample 6[*6] | | | | |
| Sample 7[*7] | | | | |
| Sample 8[*8] | ○ | | ○ | ○ |
| Sample 9[*9] | | ○ | | |
| Amount of the aforesaid Metallic Compound Blended to 100 Parts of Rubber Component (Amount Converted to Metal) (Part) | 0.2 | 0.2 | 0.2 | 0.2 |
| SUMIKANOL 620 (Sumitomo Chemical Co., Ltd.)[*11] Resorcin/Formalin Reaction Product | | | 2 | |
| PENACOLITE RESIN B19-S (Indospech Co.) Resorcin (Sumitomo Chemical Co., Ltd.) | | | | 2 |
| SCILETTU 963L (Mitsui Sciteck)[*12] | | | 4 | 4 |
| Hexamethylenetetramine | | | | |
| NOXELER H (Ouchi Shinko Kagaku K. K.) | | | | |
| Silica (NIPSEAL AQ, Nippon Silica K. K.) | | | | |
| Initial Adhesion | | | | |
| Peel Force | 106 | 105 | 129 | 127 |
| Covering Ratio of Rubber | 100 | 100 | 100 | 100 |
| Heat-Resistant Adhesion | | | | |
| (160° C. × 96 h age) | | | | |
| Peel Force | 106 | 107 | 103 | 105 |
| Covering Ratio of Rubber | 80 | 80 | 100 | 100 |
| Moist Heat-Resistant Adhesion | | | | |
| (105° C. × 96 h steam age) | | | | |
| Peel Force | 124 | 125 | 127 | 125 |
| Covering Ratio of Rubber | 10 | 10 | 10 | 10 |
| Aging Resistance (90° C. × 192 h age) | | | | |
| Degree of Improvement | 110 | 106 | 111 | 113 |

TABLE 5

| | Example | | | |
|---|---|---|---|---|
| | 11 | 12 | 13 | 14 |
| Cobalt Stearate | | | | |
| Sample 6[*6] | | | | |
| Sample 7[*7] | | | | |
| Sample 8[*8] | ○ | ○ | ○ | |
| Sample 9[*9] | | | | |
| Sample 10[*10] | | | | ○ |
| Amount of the aforesaid Metallic Compound Blended to 100 Parts of Rubber Component (Amount Converted to Metal) (Part) | 0.2 | 0.2 | 0.2 | 0.2 |
| SUMIKANOL 620 (Sumitomo Chemical Co., Ltd.)[*11] Resorcin/Formalin Reaction Product | | 2 | 2 | 2 |
| PENACOLITE RESIN B19-S (Indospeck Co.) Resorcin (Sumitomo Chemical Co., Ltd.) | 2 | | | |
| SCILETTU 963L (Mitsui Sciteck)[*12] | 4 | | 4 | 4 |
| Hexamethylenetetramine | | 4 | | |
| NOXELER H (Ouchi Shinko Kagaku K. K.) | | | | |
| Silica (NIPSEAL AQ, Nippon Silica K. K.) | | | | 10 |
| Initial Adhesion | | | | |
| Peel Force | 131 | 127 | 118 | 127 |
| Covering Ratio of Rubber | 100 | 100 | 100 | 100 |
| Heat-Resistant Adhesion | | | | |
| (160° C. × 96 h age) | | | | |
| Peel Force | 103 | 101 | 103 | 106 |
| Covering Ratio of Rubber | 90 | 90 | 90 | 80 |
| Moist Heat-Resistant Adhesion | | | | |
| (105° C. × 96 h steam age) | | | | |
| Peel Force | 127 | 125 | 122 | 117 |
| Covering Ratio of Rubber | 10 | 15 | 40 | 10 |
| Aging Resistance (90° C. × 192 h age) | | | | |
| Degree of Improvement | 109 | 111 | 110 | 107 |

[*1)]Ni naphthenate/Mo naphthenate (Ni/Mo = 6/1 (mole ratio))
[*2)]Ni naphthenate/Mo naphthenate (Ni/Mo = 2/1 (mole ratio)) and 10 weight % of Co naphthenate (to total weight % of Ni and Mo)
[*3)]Ni naphthenate/Mo naphthenate (Ni/Mo = 4/1 (mole ratio)) and 10 weight % of Co naphthenate (to total weight % of Ni and Mo)
[*4)]Ni naphthenate/Mo naphthenate (Ni/Mo = 6/1 (mole ratio)) and 10 weight % of Co naphthenate (to total weight % of Ni and Mo)
[*5)]Ni naphthenate/Mo naphthenate (Ni/Mo = 8/1 (mole ratio)) and 10 weight % of Co naphthenate (to total weight % of Ni and Mo)

TABLE 5-continued

| | Example | | | |
|---|---|---|---|---|
| | 11 | 12 | 13 | 14 |

*6)Ni naphthenate/Mo naphthenate (Ni/Mo = 20/1 (mole ratio)) and 10 weight % of Co naphthenate (to total weight % of Ni and Mo)
*7)Ni naphthenate/Mo naphthenate of high acid value (300 mg KOH/g) (Ni/Mo = 6/1 (mole ratio)) and 10 weight % of Co naphthenate of high acid value (300 mg KOH/g) (to total weight % of Ni and Mo)
*8)(Ni octylate + Ni naphthenate [octylic acid:naphthenic acid = 7:3])/Mo naphthenate of high acid value (300 mg KOH/g) (Ni/Mo = 6/1 (mole ratio)) and 10 weight % of Co naphthenate of high acid value (300 mg KOH/g) (to total weight % of Ni and Mo)
*9)(Ni octylate + Ni naphthenate [octylic acid:naphthenic acid = 7:3])/Mo naphthenate of high acid value (300 mg KOH/g) (Ni/Mo = 6/1 (mole ratio)) and 20 weight % of Co naphthenate of high acid value (300 mg KOH/g) (to total weight % of Ni and Mo)
*10)(Ni octylate + Ni naphthenate [octylic acid:naphthenic acid = 7:3])/Mo naphthenate of high acid value (300 mg KOH/g) (Ni/Mo = 6/1 (mole ratio)) and 10 weight % of Co naphthenate of high acid value (300 mg KOH/g) (to total weight % of Ni and Mo) (Herein, part of such organic acids is replaced with Ca borate at a weight ratio of 2%)
*11)Resorcin/alkylphenol/formalin copolymer resin
*12)Hexamethoxymethylmelamine

What is claimed is:

1. A rubber composition for adhering to steel cords excellent in adhesion to steel cords wherein the following component (A) in a metal-converted amount of 0.01 to 10 weight parts is blended to 100 weight parts of a rubber component containing natural rubber and/or diene synthetic rubber:

(A) a mixture of a compound containing nickel, a compound containing molybdenum, and a compound containing cobalt; a compound containing nickel, molybdenum, and cobalt simultaneously; or a mixture of a compound containing simultaneously two metallic elements selected from nickel, molybdenum, and cobalt and a compound containing the residual metallic element.

2. The composition of claim 1 wherein component (B) comprising the following (b1) and (b2) is further blended:

(B) (b1) 0.2 to 20 weight parts of hexamethylenetetramine or a melamine derivative, and (b2) 0.1 to 10 weight parts of at least one selected from the group consisting of phenol resins, resorcin, resorcin derivatives, and cresol resins.

3. The composition of claim 1 wherein a compound containing calcium (C) is further blended.

4. The composition of claim 3 wherein the aforesaid compound containing calcium (C) is blended in an amount of 0.1% to 20% in weight ratio to the aforesaid component (A).

5. The composition of any one of claims 1 to 4 and 7 wherein silica (D) is further blended.

6. The composition of claim 5 wherein the aforesaid silica (D) is blended in an amount of 1 to 100 weight parts to 100 weight parts of the rubber component.

7. The composition of claim 2 wherein a compound containing calcium (C) is further blended.

* * * * *